US012570345B2

(12) United States Patent
Currier et al.

(10) Patent No.: US 12,570,345 B2
(45) Date of Patent: Mar. 10, 2026

(54) GRAVITY CENTERING CART

(71) Applicant: NOMAD EVOLUTION INC.,
Bainbridge Island, WA (US)

(72) Inventors: Ethan Currier, Bainbridge Island, WA
(US); Nathaniel Durrance, Bainbridge
Island, WA (US)

( * ) Notice: Subject to any disclaimer, the term of this
patent is extended or adjusted under 35
U.S.C. 154(b) by 279 days.

(21) Appl. No.: 18/268,199

(22) PCT Filed: Dec. 17, 2021

(86) PCT No.: PCT/US2021/064217
§ 371 (c)(1),
(2) Date: Jun. 16, 2023

(87) PCT Pub. No.: WO2022/133321
PCT Pub. Date: Jun. 23, 2022

(65) Prior Publication Data
US 2024/0294203 A1 Sep. 5, 2024

Related U.S. Application Data

(60) Provisional application No. 63/142,681, filed on Jan.
28, 2021, provisional application No. 63/125,974,
filed on Dec. 17, 2020.

(51) Int. Cl.
| | |
|---|---|
| *B62B 5/00* | (2006.01) |
| *A61G 1/02* | (2006.01) |
| *A61H 3/04* | (2006.01) |
| *B62B 1/10* | (2006.01) |
(Continued)

(52) U.S. Cl.
CPC .......... B62B 5/0033 (2013.01); A61G 1/0275
(2013.01); A61H 3/04 (2013.01); B62B 1/10
(2013.01); B62B 1/18 (2013.01); B62B 5/0069
(2013.01); B62B 5/06 (2013.01); *A61H
2003/043* (2013.01); *A61H 2003/046*
(2013.01); *A61H 2201/1635* (2013.01)

(58) Field of Classification Search
CPC .......... B62B 5/0033; B62B 1/10; B62B 1/18;
B62B 5/0069; B62B 5/06; A61G 1/0275;
A61H 3/04; A61H 2003/043; A61H
2003/046; A61H 2201/1635; B62J 11/00;
B62K 7/04; B62K 13/00; B62K 11/007
See application file for complete search history.

(56) References Cited

U.S. PATENT DOCUMENTS

| | | | | | |
|---|---|---|---|---|---|
| 6,446,988 | B1 * | 9/2002 | Kho | .......................... | B62B 1/12 |
| | | | | | 280/655.1 |
| 10,080,937 | B1 * | 9/2018 | Nichol | .................... | B62B 1/262 |

(Continued)

FOREIGN PATENT DOCUMENTS

| | | | | | | |
|---|---|---|---|---|---|---|
| CN | | 201980307 | U | * | 9/2011 | .......... B60K 7/0007 |
| CN | | 103552637 | A | * | 2/2014 | |

(Continued)

*Primary Examiner* — Drew J Brown
(74) *Attorney, Agent, or Firm* — Newman LLP

(57) ABSTRACT

The present disclosure is directed to devices, systems and
methods for a gravity centering cart that permits a user to
exercise (e.g., walk, jog or run) while utilizing helpful
functionality provided by the gravity centering cart, such as
having the cart carry a load with minimal resistance felt by
the user pulling or pushing the cart.

20 Claims, 15 Drawing Sheets

(51) Int. Cl.
    B62B 1/18        (2006.01)
    B62B 5/06        (2006.01)

(56)            References Cited

U.S. PATENT DOCUMENTS

| | | | | |
|---|---|---|---|---|
| 2013/0248573 A1 * | 9/2013 | Kim | .......................... | A45C 9/00 |
| | | | | 224/576 |
| 2018/0354539 A1 * | 12/2018 | Casey | ................... | B62B 5/0033 |
| 2019/0015732 A1 * | 1/2019 | Rosemeyer | .......... | A63C 17/014 |

FOREIGN PATENT DOCUMENTS

| | | | | | | |
|---|---|---|---|---|---|---|
| CN | 104709847 | A | * | 6/2015 | .............. | B66F 9/075 |
| CN | 108618903 | A | * | 10/2018 | .............. | A61G 1/04 |
| CN | 211519612 | U | * | 9/2020 | | |
| CN | 113386887 | A | * | 9/2021 | ................ | B62J 1/08 |
| CN | 114408012 | B | * | 2/2023 | .............. | B62B 5/00 |
| JP | 2015527248 | A | * | 9/2015 | .......... | B60L 15/2009 |
| WO | WO-2021028137 | A1 | * | 2/2021 | ............... | B62B 1/18 |
| WO | WO-2021074523 | A1 | * | 4/2021 | ............ | B62B 5/005 |
| WO | WO-2022229488 | A1 | * | 11/2022 | ............ | B62D 51/04 |
| WO | WO-2024246195 | A1 | * | 12/2024 | .............. | A61H 3/04 |

* cited by examiner

50

200

210

100

120

110

200

210

100

120

110

GRAVITY CENTERING CART

CROSS-REFERENCE TO RELATED APPLICATIONS

This application claims priority and benefit to U.S. Provisional Application No. 63/125,974, filed on Dec. 17, 2020, entitled "Self-Balancing Transporter and Accessories" and U.S. Provisional Application No. 63/142,681, filed on Jan. 28, 2021, entitled "Gravity Centering Cart", the contents of which are incorporated herein by this reference as though set forth in their entirety.

FIELD OF USE

The present disclosure relates generally to systems, devices and methods for use with a gravity centering cart, also referred to as a self-balancing transporter.

BACKGROUND

Self-balancing personal transporters exist on in the market. For example, several one and two wheel devices like Segway, Onewheel, Solowheel, and Airwheel, as well as a variety of multi-wheel hoverboards, are commercially available as self-balancing personal transporters. These devices require a user to stand upright, tilt their center of gravity, and use their feet to control the motion and direction of the transporter. Self-balancing stand-up personal transporters are useful because they generally can move a person faster than walking and are typically electric battery powered, providing several hours of use between recharging and enabling longer journeys.

Although these self-balancing personal transporters are useful, they have their disadvantages because not everyone is skilled enough to ride them. For example, using one of these devices can be surprisingly fatiguing because these devices require a user to travel standing up and balancing on the device, which requires constant use of the user's muscles. A user can also easily fall from these devices, for example when the device hits an obstacle, such as a rock or a rut. If the wheel of one of these devices strikes an obstacle and suddenly changes direction or speed, momentum will cause the user to continue in the direction of travel and fall off the device. Thus, there is a need for an accessory that would permit a user to use a self-balancing personal transporter to assist in travel or exercise without the danger of falling off the device.

In addition to the dangers involved in riding commercially available self-balancing personal transporters, these devices have not yet been utilized to their full capability as a driving mechanism for other devices. These self-balancing personal transporters provide a unique platform with a self-driving electric motor that has not yet been utilized as the propelling mechanisms for other devices. The only known example is found in U.S. Pat. No. 9,988,114, which is not preferred because it removes the exercise and freedom of movement components by requiring a user to sit or stand, without walking themselves, to use its disclosed devices.

The presently disclosed subject matter significantly reduces the disadvantages of riding a self-balancing transporter, such as a multi-wheel hoverboard, Segway, Onewheel, Solowheel or Airwheel, and provides accessories for these devices that transforms their usefulness and functionality and increasing human movement, health, and efficiency of effort.

SUMMARY OF THE DISCLOSURE

The following presents a simplified overview of the example embodiments to provide a basic understanding of some embodiments of the present disclosure. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

The present disclosure is directed to devices, systems and methods that transform a self-balancing personal transporter into a gravity centering cart that permits a user to exercise (e.g., walk, jog or run) or perform daily activities while utilizing helpful functionality provided by the gravity centering cart, such as carrying cargo for the user, pushing or pulling the user, helping balance the user, or providing support for the user.

The present disclosure is also directed to devices, systems and methods that transform a self-balancing personal transporter into a gravity centering cart that can be pushed or pulled by a user with minimal effort and near zero or minimal resistance from the gravity centering cart.

The present disclosure is also directed to devices, systems and methods that provide many embodiments of new and different self-balancing transporters or gravity centering carts that can be used for a variety of functions for moving objects with reduced effort and reduced resistance, such as with a wheelbarrow, grocery cart, stroller, stretcher, garden cart, handtruck, or any other rolling device that moves objects or weight that a user will push or pull.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The accompanying drawings, which are incorporated in and constitute a part of this specification, illustrate embodiments of the disclosure and together with the general description of the disclosure given above and the detailed description of the drawings given below, serve to explain the principles of the disclosure. In certain instances, details that are not necessary for an understanding of the disclosure or that render other details difficult to perceive may have been omitted.

DETAILED DESCRIPTION OF EMBODIMENTS

Before the present systems and methods are disclosed and described, it is to be understood that the systems and methods are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1:
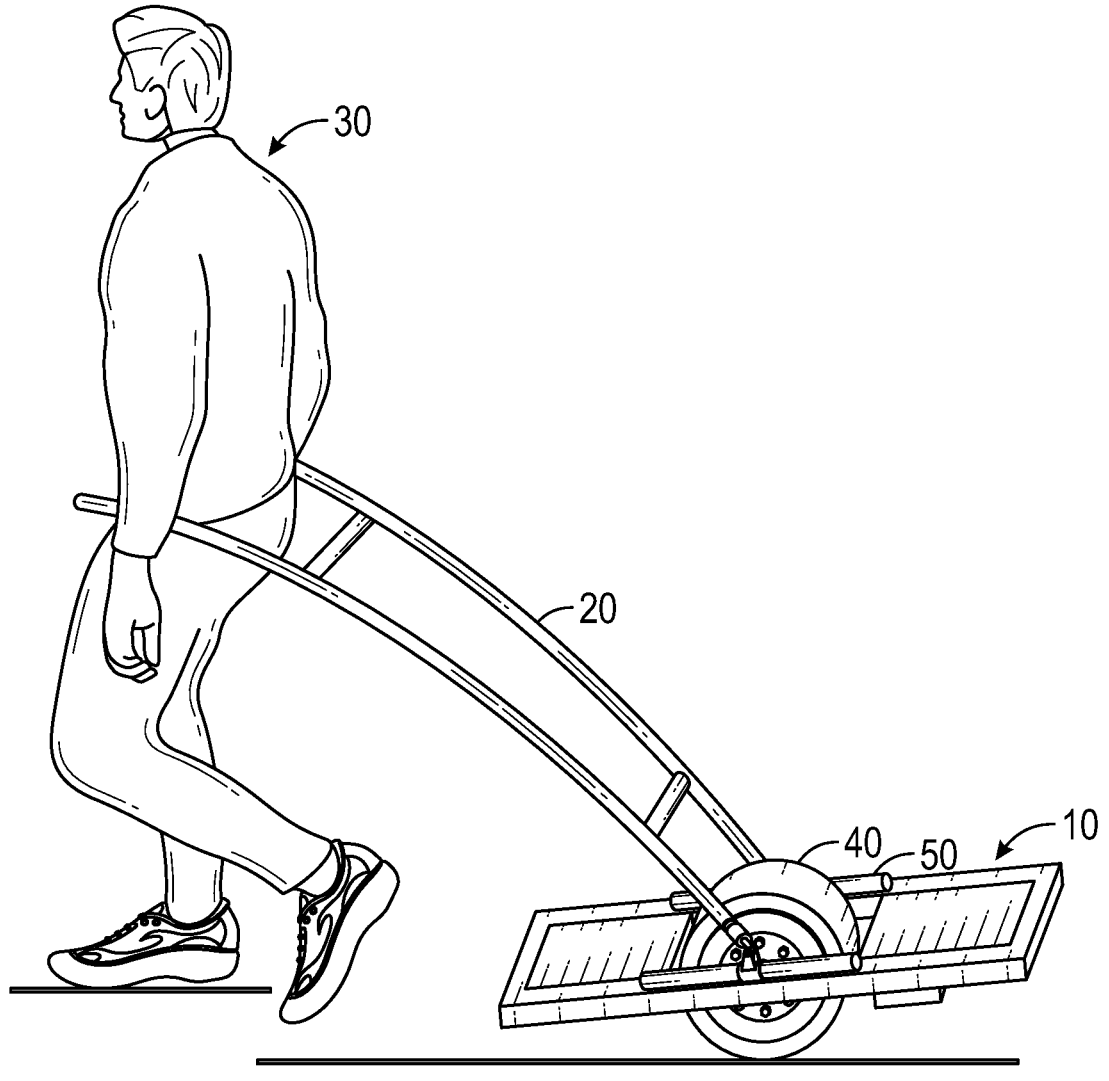
FIG. 1 is a perspective side view of a self-balancing transporter connected to a stabilizing structure connected to a human user in accordance with one or more embodiments of the present invention.

Referring to FIG. 1, a human user 30 is using an embodiment of a self-balancing transporter assembly 10 and a stabilizing structure 20. In this embodiment, the user 30 is walking with the self-balancing transporter assembly 10 and stabilizing structure 20 behind the user 30 with the stabilizing structure 20 connected to the user 30 near a waistline. In other embodiments, the user 30 can walk with the self-balancing transporter assembly 10 and stabilizing structure 20 in front of the user 30 with the stabilizing structure 20 connected to the user 30 near a waistline. In other embodiments, similar to FIG. 2, the user 30 can hold the stabilizing structure 20 in their hands rather than being connected to the user hands free.

Figure 2:
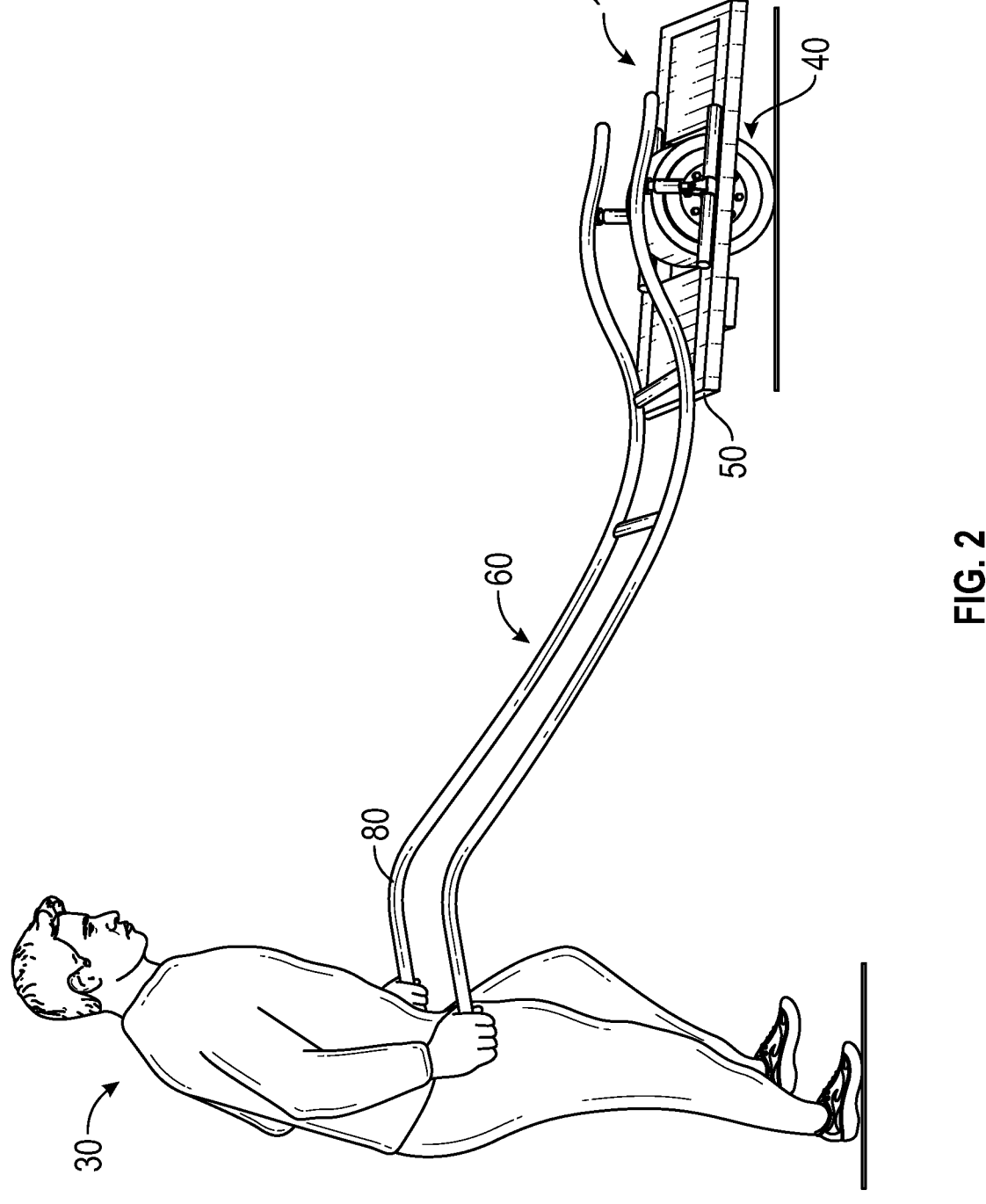
FIG. 2 is a perspective side view of a self-balancing transporter connected to a load bearing structure held by a human user in accordance with one or more embodiments of the present invention.

In another embodiment, a self-balancing transporter assembly 10 depicted in FIG. 1 can be used as a power source to pull a walking user 30 and reduce the walking load on the user 30 if the user 30 faced the opposite direction and either connected or held the stabilizing structure 20 in front of the user, for example as the user 30 is walking in FIG. 2.

Referring to FIG. 2, a human user 30 is using an embodiment of a self-balancing transporter assembly 10 and a load carrying structure 60. In this embodiment, the user 30 is walking with the self-balancing transporter assembly 10 and load carrying structure 60 in front of the user 30 with handles 80 of the load carrying structure 60 being held in hands of the user 30. In other embodiments, similar to FIG. 1, the user 30 can walk with the self-balancing transporter assembly 10 and load carrying structure 60 behind the user 30 with the load carrying structure 60 connected to the user 30 near a waistline or held by the handles 80 of the load carrying structure 60. In embodiments, the load carrying structure 60 is utilized to carry a load for the user 30, with the user 30 only needing to lift the handles 80 of the load carrying structure 60 and being able to give a light push or pull on the handles 80 to engage the transporter 40 to move and carry the load to an intended destination.

In embodiments, the self-balancing transporter assembly 10 may include one or more compartments to store a load of materials or goods. This embodiment permits the load to be transported by the user 30 with ease because the self-balancing transporter assembly 10 will support and carry the load in the direction dictated by the user 30 using the stabilizing structure 20 or the load bearing structure 60.

In other embodiments, the self-balancing transporter assembly 10 can be used to tow a trailer that can carry a load for the user 30, with the self-balancing transporter assembly 10 towing the trailer and load in the direction dictated by the user 30 using the stabilizing structure 20 or the load bearing structure 60. In embodiments, the trailer is configured to hold or store specific types of loads, such as carrying the self-balancing transporter assembly 10.

In embodiments, the self-balancing transporter assembly 10 comprises a single wheel self-balancing transporter 40 that is permanently or removably fixed to an engagement attachment 50. In embodiments, the stabilizing structure 20 or the load bearing structure 60 are permanently or removably fixed to the engagement attachment 50. In embodiments, the stabilizing structure 20 or the load bearing structure 60 are permanently or removably fixed to the self-balancing transporter assembly 10. In embodiments, the self-balancing transporter 40 can be disconnected from the engagement attachment 50 and stabilizing structure 20 or load bearing structure 60, permitting the self-balancing transporter 40 to be used in an upright standing position.

In embodiments, when the self-balancing transporter assembly 10 is turned on and engaged, the assembly 10 and stabilizing structure 20 or load bearing structure 60 will follow, with minimal resistance, the user 30 as he walks forward, walks backward, or stops. In these embodiments, the self-balancing transporter assembly 10 follows the direction of movement of the user 30 on the stabilizing structure 20 or load bearing structure 60 that is connected to the self-balancing transporter assembly 10 and is held by or connected to the user 30. By slight movements forward and backward on the stabilizing structure 20 or load bearing structure 60, the user 30 controls the forward and backward movement, speed, and the turning of the self-balancing transporter assembly 10. This requires that a certain minimum force be applied to the transporter assembly 10 via the stabilizing structure 20 or load bearing structure 60 with freedom for the transporter assembly 10 to turn.

In embodiments where the user 30 is separated from the transporter assembly 10, the user 30 is no longer required to be a skilled user of a self-balancing transporter 40 to utilize the improved functionality of the transporter 40 having the transporter assembly 10. Instead, a user 30 can simply walk in any desired direction with the stabilizing structure 20 or load bearing structure 60 and the self-balancing transport assembly 10 will follow. This separation causes a substantial increase in safety over the use of the self-balancing transporter 40 by itself. In embodiments, because the self-balancing transporter assembly 10 and transporter 40 are not integral with the user 30, since the user can let go or detach themselves from a stabilizing structure 20 or load bearing structure 60 of the system, should the self-balancing transporter 40 strike an obstruction, such as a rock, curb, bump, or the like, the effect of the obstruction is not transferred to the user 30. This arrangement, combined with other safety features, such as a magnetically detachable coupling between a magnet on a user 30 and the stabilizing structure 20, the safety features of the self-balancing transport assembly 10, protects the user 30 from a fall or resultant injury.

In embodiments that require a user to walk to give a small push or pull force on the transporter assembly 10 via a stabilizing structure 20 or load bearing structure 60, the user 30 is benefitting from walking and exercising. Users 30 that normally would be unstable or unsure walking, or users 30 that could use a boost or push along their walk, will greatly benefit from using the self-balancing transporter assembly 10 because the user 30 can, for example, use the stabilizing structure 20 or load bearing structure 60 attached to the self-balancing transporter assembly 10 for helping stabilize or balance the user 30 or for a push or pull of the user 30. In these embodiments, in addition to exercise and health benefits, a user's 30 efforts are multiplied with the transporter assembly 10 used with a stabilizing structure 20 or load bearing structure 60 carrying an additional load for the user 30 or the transporter assembly 10 itself carrying or towing a load for the user 30.

Figure 2A:
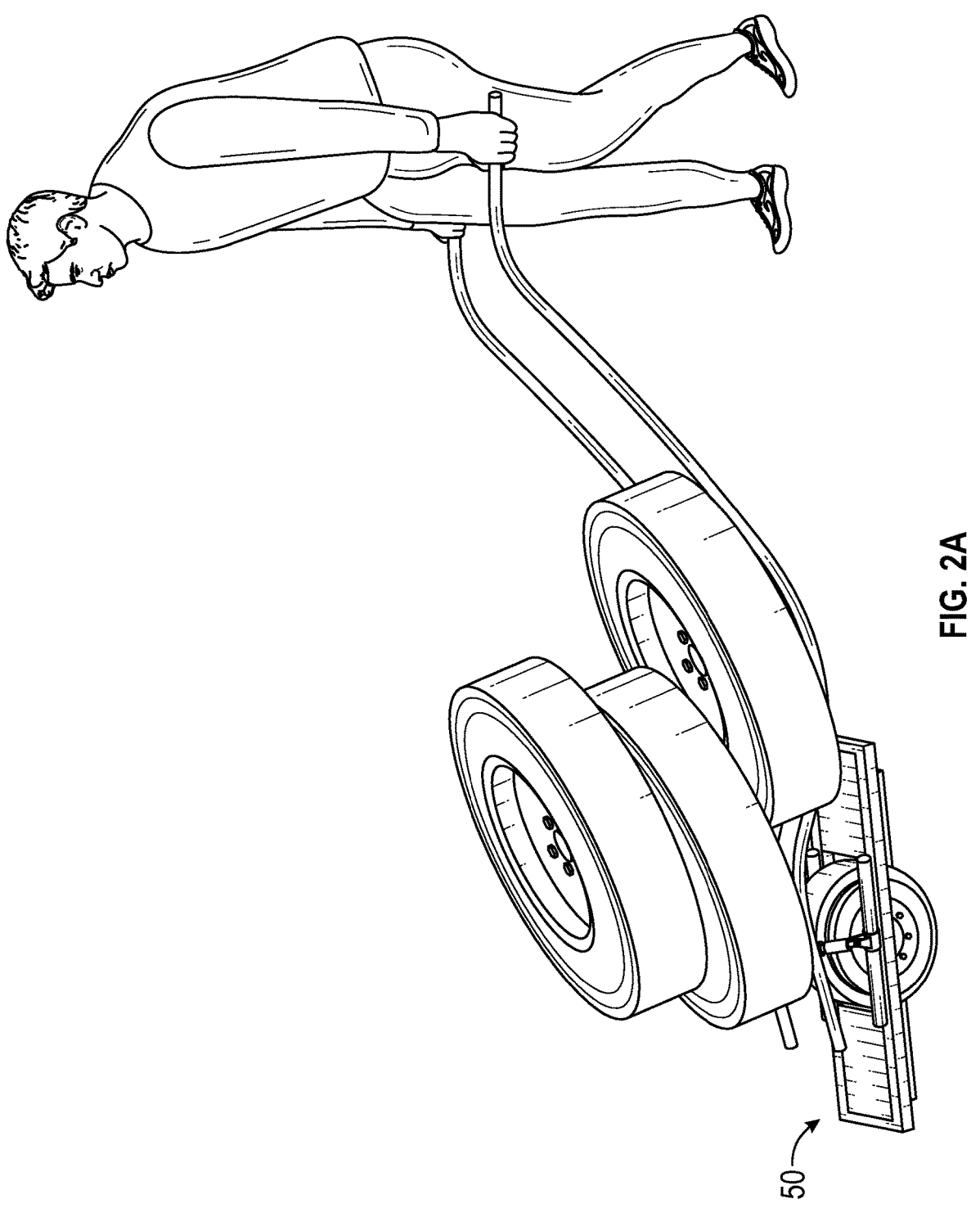
FIG. 2A is a perspective side view of a self-balancing transporter connected to a load bearing structure held by a human user in accordance with one or more embodiments of the present invention.

In embodiments, the self-balancing transporter 40 is a Onewheel brand self-balancing transporter, such as that described in U.S. Pat. No. 9,968,841, the entirety of which is incorporated by reference. A Onewheel brand self-transporter is preferred because it does not necessarily require a downward force applied to it to operate. A user 30 can therefore turn the self-balancing transporter 40 using the stabilizing structure 20 or load bearing structure 60. For example, moving the stabilizing structure 20 or load bearing structure 60 left will cause the self-balancing transporter assembly 10 to lean, and thus turn, left. The same is true for turning right, with movement right by the user 30 holding a structure connected to transporter 40 will cause the transporter to turn right. An example embodiment of a self-balancing transporter assembly 10 utilizing a Onewheel brand self-balancing transporter 40 with a load bearing structure 60 carrying a load is depicted in FIG. 2A.

In embodiments, the self-balancing transporter 40 comprises a board, a wheel assembly, a motor assembly, at least one sensor, and a motor controller. The transporter 40 may include first and second deck portions each configured to receive a load. The wheel assembly may be disposed between the first and second deck portions and include a ground-contacting element, such as a wheel. The motor assembly may be mounted to the transporter 40 and configured to rotate the ground-contacting element around an axle to propel the electric transporter 40. A sensor of the transporter 40 may be configured to measure orientation information of the transporter 40. The motor controller may be configured to receive orientation information measured by the sensor and to cause the motor assembly to propel the electric transporter 40 based on the orientation information. For example, the transporter 40 may be propelled by the motor based on the orientation of the board, with the transporter 40 moving forward when the board is tilted forward or backward when the board is tilted backward. In another example, the sensor is configured to cause the transporter 40 to move in a direction of the center of gravity that is coupled to the transporter 40.

Figure 3:
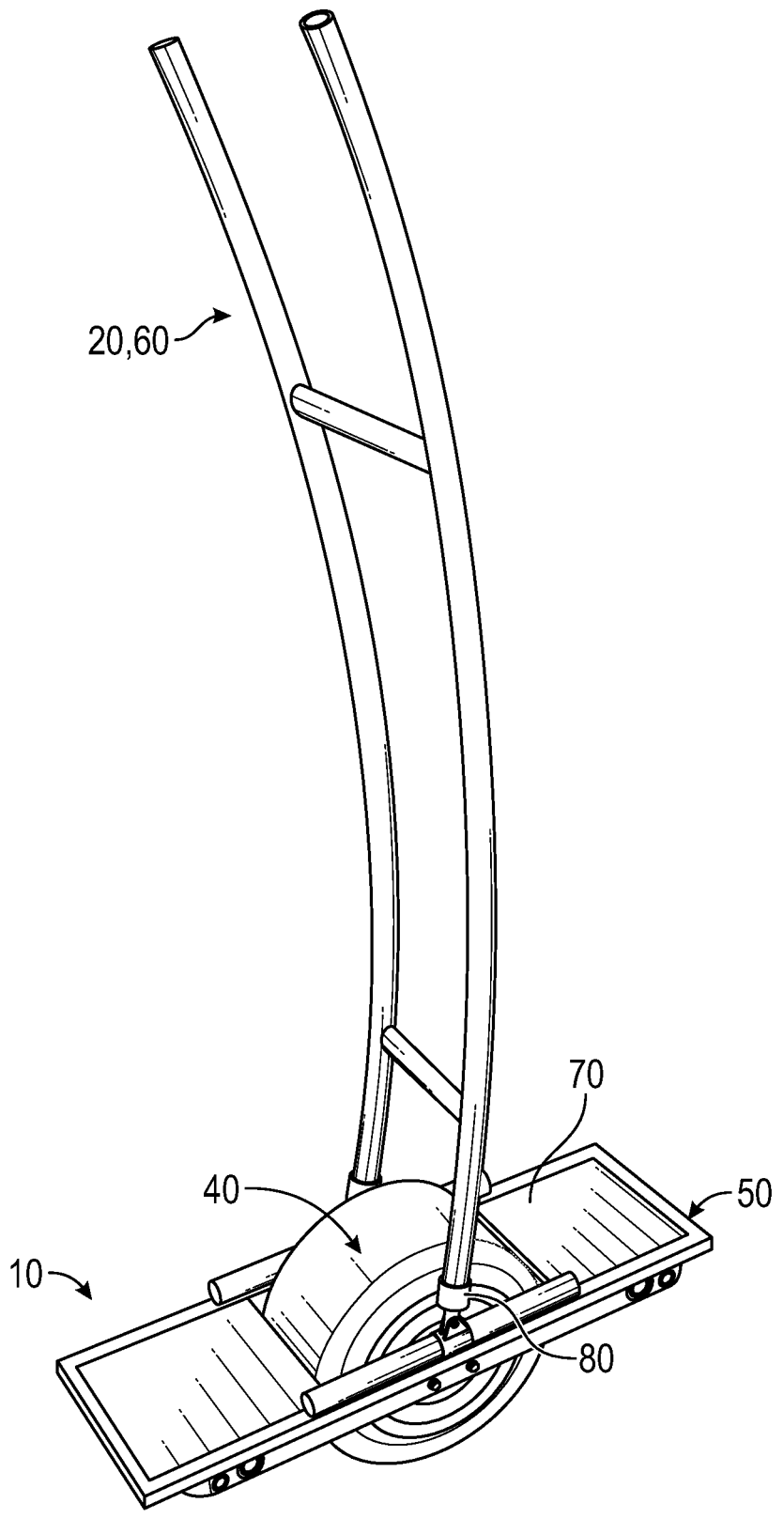
FIG. 3 is a perspective side view of a self-balancing transporter assembly having an engagement attachment attached to a self-balancing transporter in accordance with one or more embodiments of the present invention.

Referring to FIG. 3 (and FIG. 2A), an embodiment of an engagement attachment 50 of a self-balancing transporter assembly 10 is described. The engagement attachment 50 may be any suitable coupling means sized and configured to connect to a self-balancing transporter 40. For example, in an embodiment depicted in FIG. 3, the self-balancing transporter is a Onewheel brand transporter with a rectangular top portion and the engagement attachment has a rectangular metal body that is designed to be removably coupled and fit onto the rectangular top portion of the Onewheel. In an embodiment, the engagement attachment has a rigid bar 70 that engages with a portion of a platform of the transporter 40, thereby engaging the transporter and its self-balancing functionality. For example, in an embodiment where the transporter is a Onewheel brand vehicle, the rigid bar 70 is designed to engage a foot pedal of the Onewheel thereby engaging the self-balancing functionality that propels the transporter 40.

In an embodiment, the engagement attachment 50 also has a pivotable coupling 80 configured to receive an end of a stabilizing structure 20 or load bearing structure 60. Suitable coupling devices operable to couple the stabilizing structure 20 or load bearing structure 60 to the engagement attachment 50 may include but are not limited to an opening formed on a portion of the engagement attachment to accommodate a bolt, pin, etc.; a bracket and pin arrangement; clamps, screws, bands, and/or any other coupling devices known to those skilled in the art. As shown in FIG. 3, in one embodiment the stabilizing structure 20 is fixed to engagement attachment 50 using a screw to lock the stabling structure 20 into the pivotable coupling 80. A pivotable coupling 80 is preferred because it permits a user to move the stabilizing structure (or load bearing structure) in an up and down fashion, and in other embodiments, in a side-to-side fashion, to guide the self-balancing transporter 40.

Figure 4A:
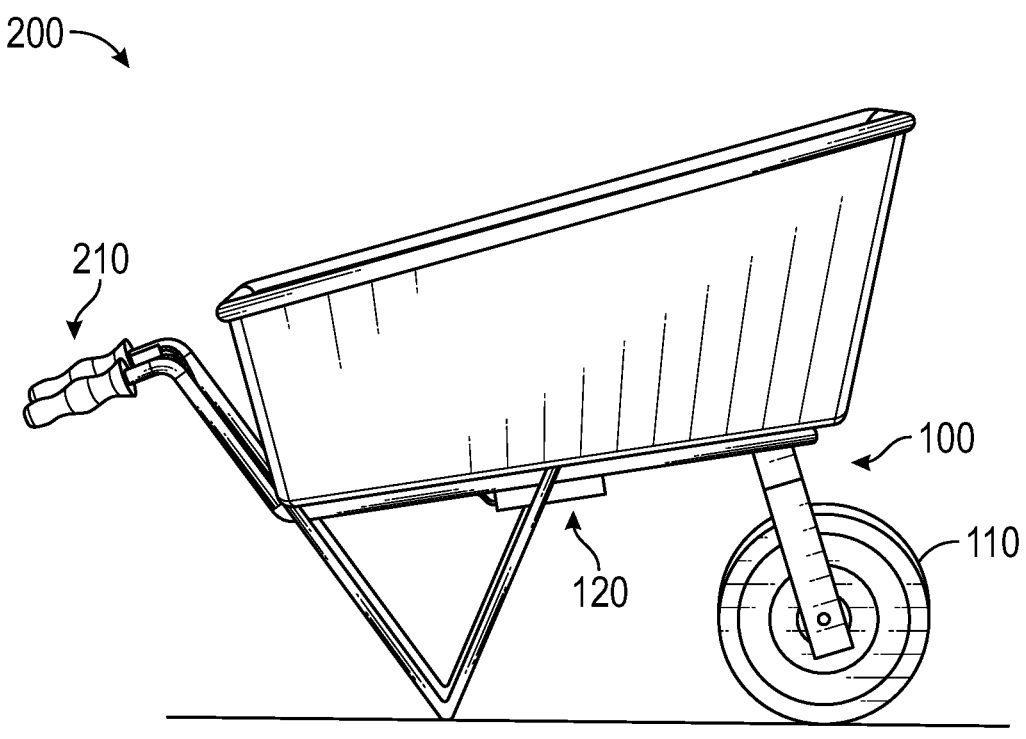
FIGS. 4A through 4D are perspective side views of a self-balancing transporter connected to a wheelbarrow in a resting position (FIG. 4A), neutral position (FIG. 4B), forward position (FIG. 4C), and backward position (FIG. 4D) in accordance with one or more embodiments of the present invention.
Figure 4B:
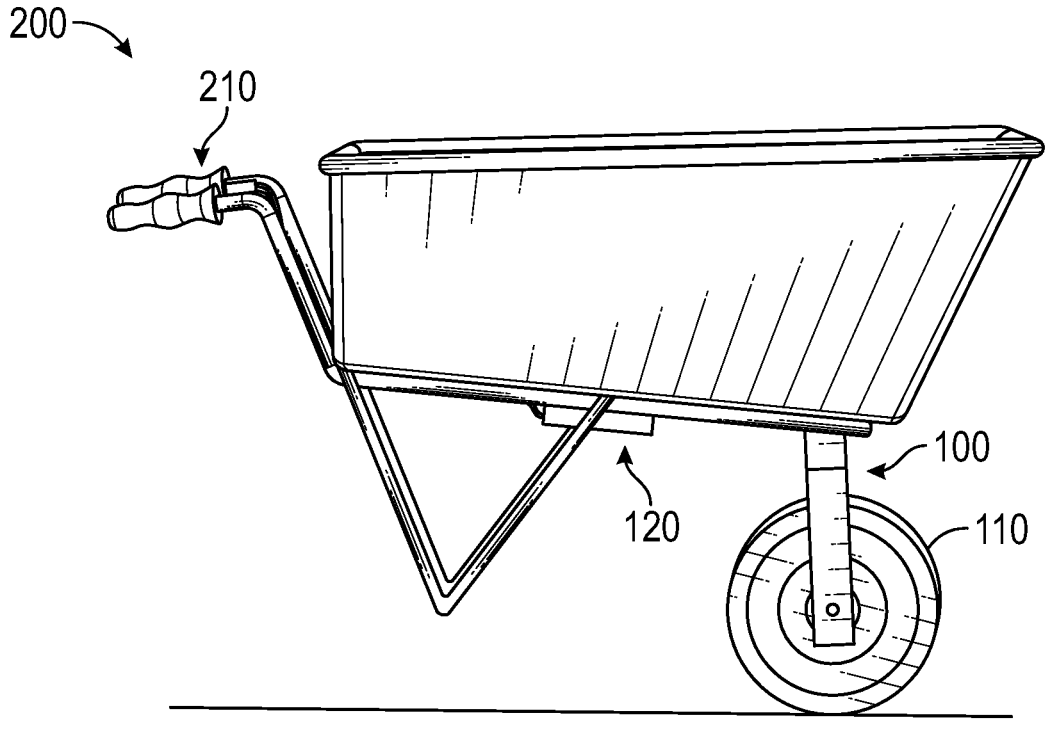
Figure 4C:
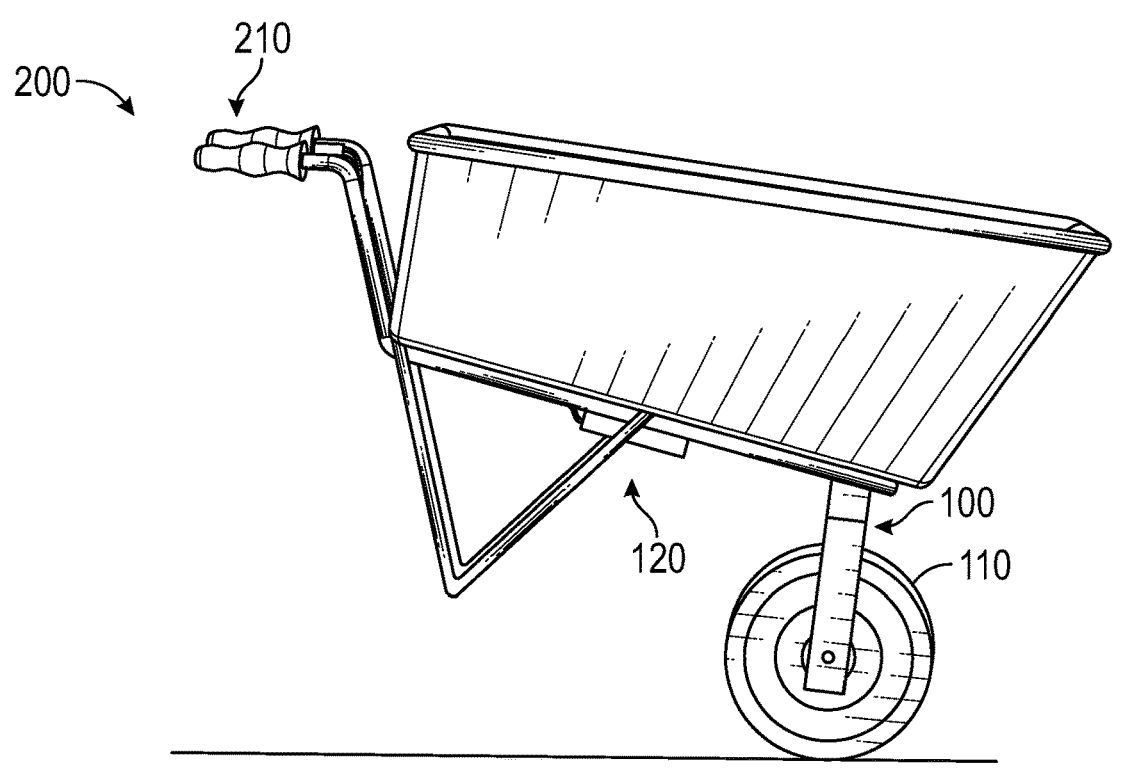
Figure 4D:
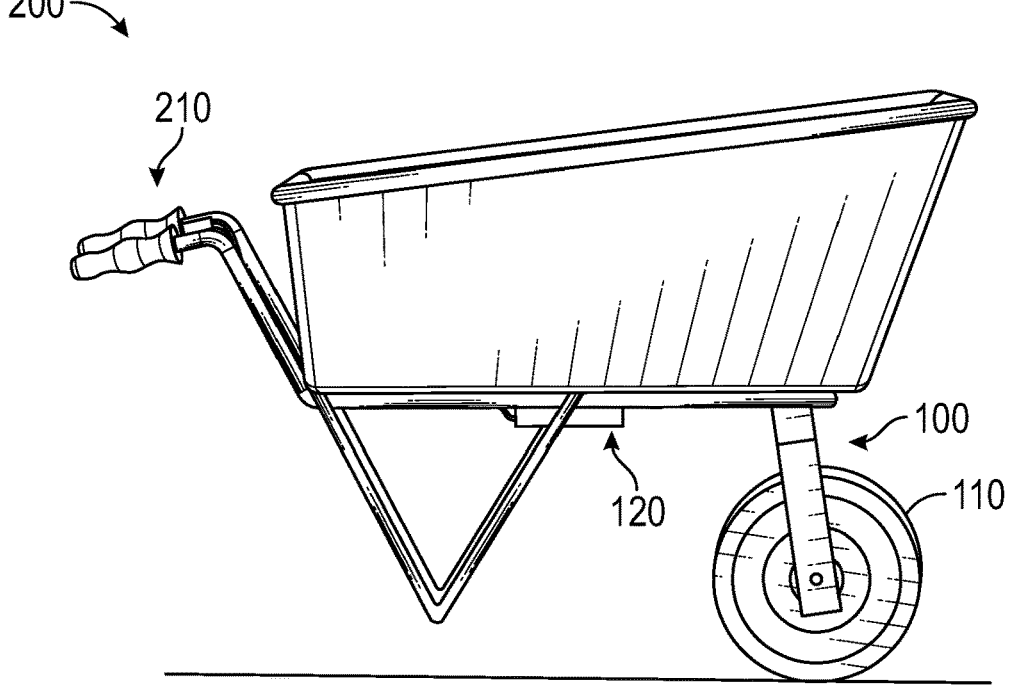
Figure 4E:
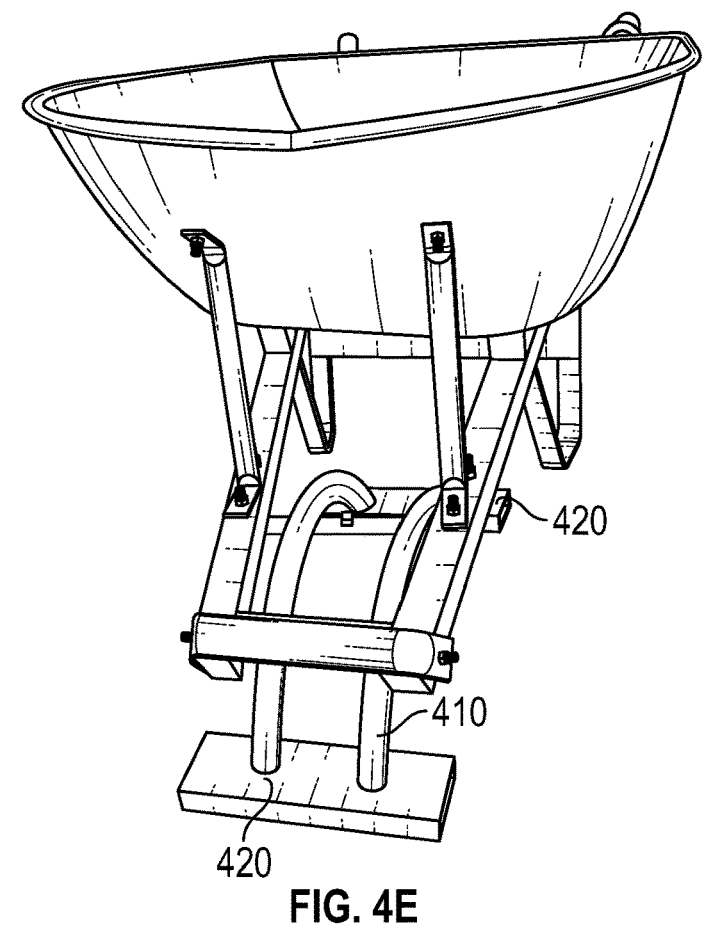
FIGS. 4E and 4F are perspective side views of a self-balancing transporter connected to a wheelbarrow in accordance with one or more embodiments of the present invention.
Figure 4F:
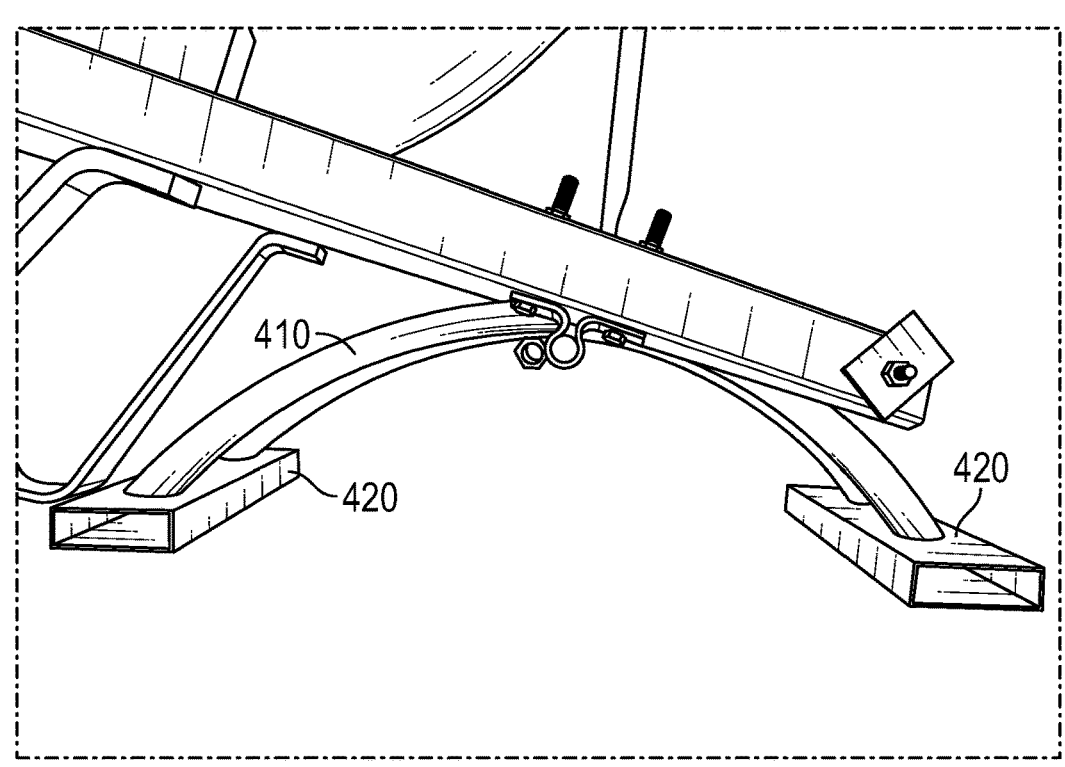

Referring to FIGS. 4A through 4E, an embodiment of an alternative self-balancing transporter assembly 100 is discussed. In an embodiment, a wheelbarrow 200 is coupled to a self-balancing transporter assembly 100 with a self-balancing transporter 110 below a front portion of the wheelbarrow 200. In embodiments, the self-balancing transporter 110 is configured to not be engaged when in a resting position (FIG. 4A), the self-balancing transporter 110 is configured to be engaged when in a neutral position (FIG. 4B), the self-balancing transporter 110 is configured to move forward utilizing its electric motor to move the wheelbarrow 200 and any load in the wheelbarrow when the wheelbarrow 200 is tiled slightly forward (FIG. 4C), and the self-balancing transporter 110 is configured to move backwards utilizing its electric motor to move the wheelbarrow 200 and any load in the wheelbarrow when the wheelbarrow 200 is tiled slightly backward (FIG. 4D). In these embodiments, a user can easily push a wheelbarrow 200 up a hill because the transporter 110 is moving the load under the directional control of the user. In embodiments, the transporter 110 utilizes a braking and recharging system of a brushless electric motor to slow the wheelbarrow 200 downhill with minimal effort of the user. In these embodiments, the transport 110 moves forward when the wheelbarrow 200 is tiled forward because the center of gravity above an axle of the transporter 110 is shifted forward and a sensor on the transporter 110 senses the weight shift and engages the motor of the transporter to move in the direction of the weight shift to catch up so the center of gravity is once again under an axle of the wheel of the transporter 110. In embodiments, the transporter 110 is a Onewheel brand electric transporter. For example, as depicted in FIGS. 4E and 4F, a wheelbarrow is configured with a curved metal platform 410 that replaces the wheelbarrows normal non-electric wheel. The curved metal platform 410 is configured to balance on a curved portion on an axle of the wheelbarrow where the non-electric wheel would normally reside. The cured metal platform 410 comprises two elongated metal bars 420 on either side of the metal platform 410, where the metal platforms 420 are configured to rest on either side of the wheel of a Onewheel self-balancing transporter such that the wheelbarrow balances on the cured metal platform 410 and Onewheel. A user can then easily push the wheelbarrow in accordance with the description of FIGS. 4A through 4E.

Figure 5:
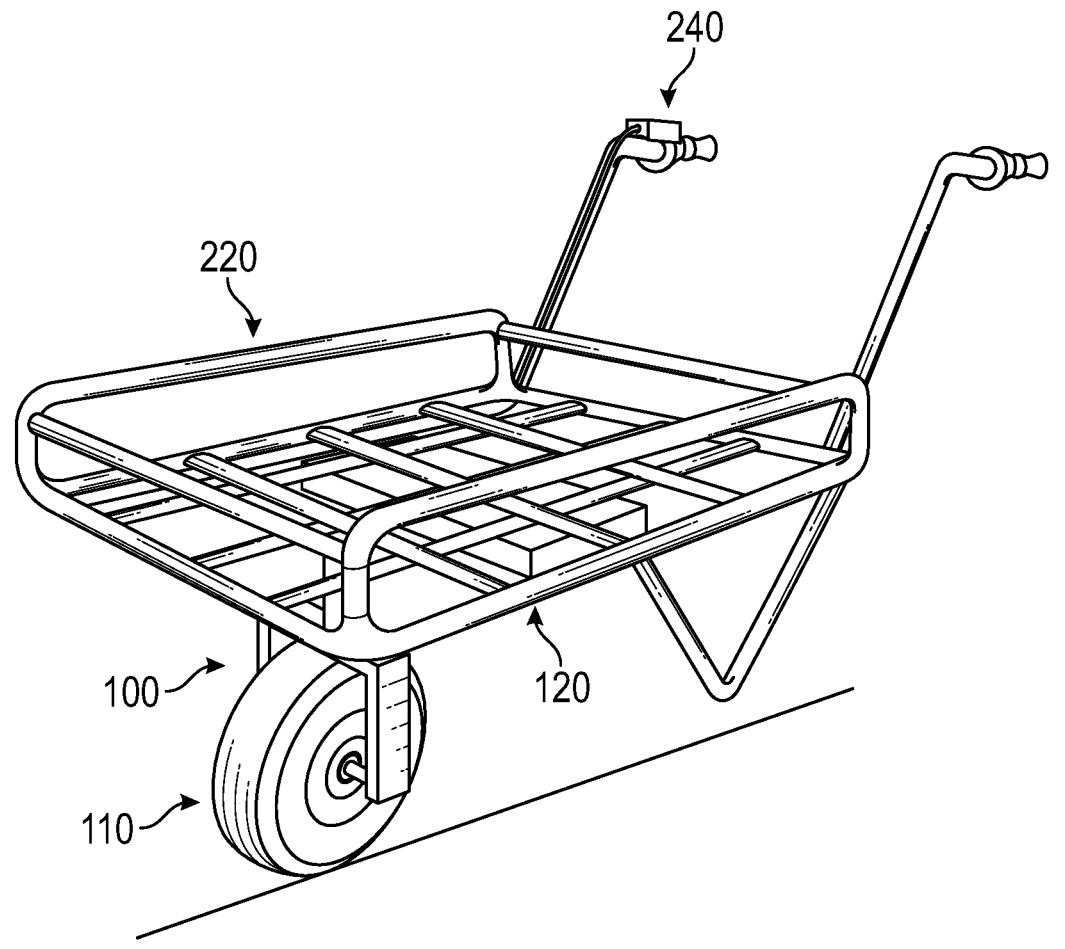
FIG. 5 is a perspective side view of a self-balancing transporter connected to a load bearing cart in a neutral position having a hand control speed mechanism in accordance with one or more embodiments of the present invention.

Referring to FIG. 5, an embodiment of an alternative self-balancing transporter assembly 100 is discussed. In an embodiment, a load bearing cart 220 is coupled to a self-balancing transporter assembly 100 with a self-balancing transporter 110 below a front portion of the load bearing cart 220. In embodiments, the self-balancing transporter 110 is configured to move according to the tilting movement described in FIGS. 4A through 4D. In other embodiments, the self-balancing transport assembly 100 is configured to be controlled by a hand control 240. For example, as shown in FIG. 5, the hand control 240 is configured to communicate with the self-balancing transporter 110 and cause the transporter 110 to move forward or backward at a specified force or speed depending on a choice made by a user holding the control 240 on the cart's handle. In other embodiments, the transporter described in other embodiments herein includes a hand control 240 for adding or controlling a force or speed of the transporter.

In these embodiments, a user can easily push the load bearing cart 220 up a hill because the transporter 110 is moving the load under the directional control of the user. In embodiments, the transporter 110 utilizes a braking and recharging system of a brushless electric motor to slow the load bearing cart 220 downhill with minimal effort of the user. In these embodiments, the transport 110 moves forward when the load bearing cart 220 is tiled forward because the center of gravity above an axle of the transporter 110 is shifted forward and a sensor on the transporter 110 senses the weight shift and engages the motor of the transporter to move in the direction of the weight shift to catch up so the center of gravity is once again under an axle of the wheel of the transporter 110. Moreover, with the hand control 240, a user can choose to have the transporter 110 push or pull with more force or speed depending on the user's selection. For example, a user may elect to have an additional 5, 10, 15, 20, etc. pounds of force added to the movement of the transporter 110 to get the cart 220 up a hill more quickly. In embodiments, the transporter 110 is a Onewheel brand electric transporter.

Figure 6:
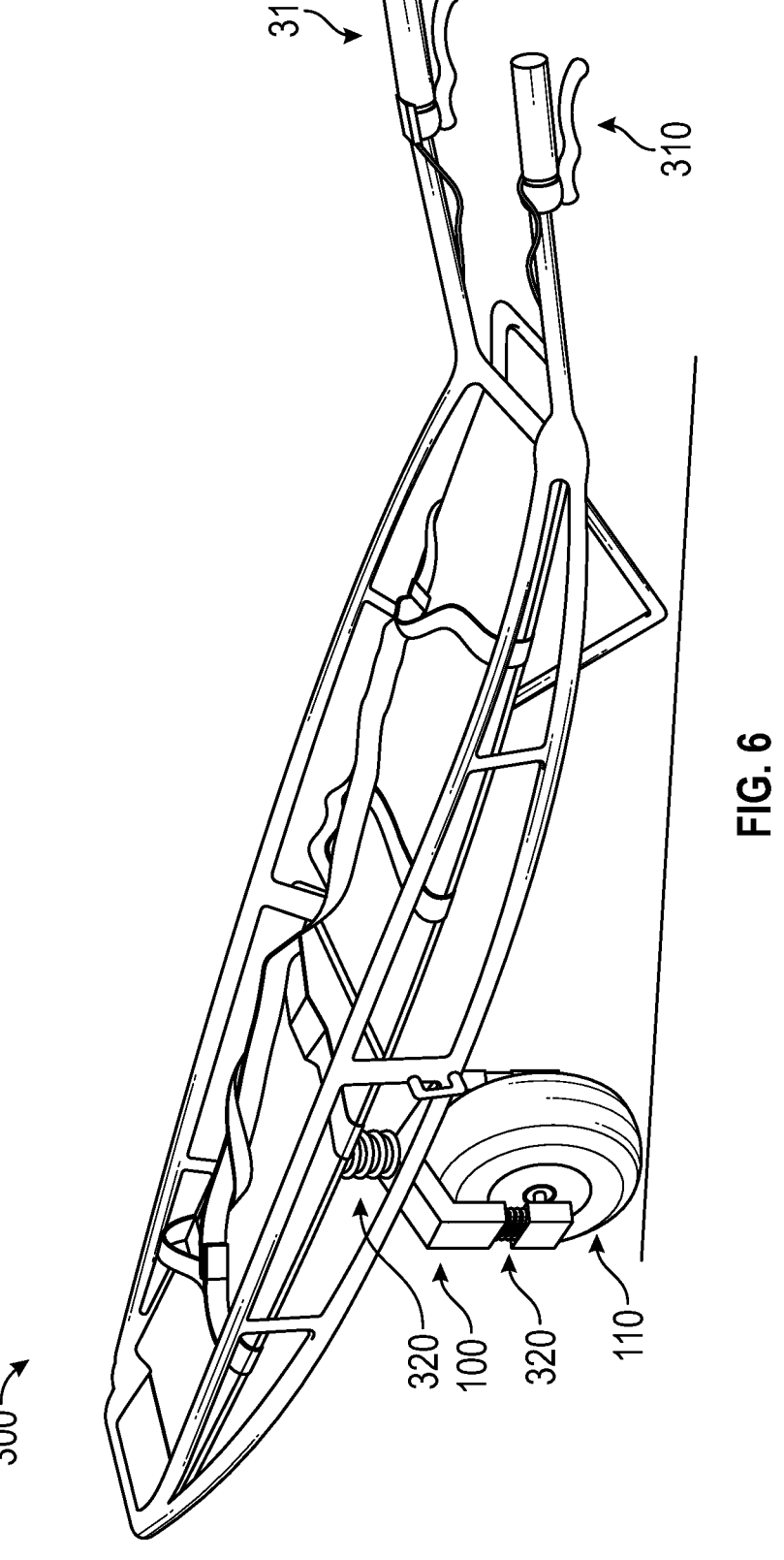
FIG. 6 is a perspective side view of a self-balancing transporter connected to a stretcher in a neutral position having a hand control speed mechanism and shock control mechanisms in accordance with one or more embodiments of the present invention.

Referring to FIG. 6, an embodiment of an alternative self-balancing transporter assembly 100 is discussed. In an embodiment, a stretcher 300 is coupled to a self-balancing transporter assembly 100 with a self-balancing transporter 110 below a front portion of the stretcher 300. In embodiments, the self-balancing transporter 110 is configured to move according to the tilting movement described in FIGS. 4A through 4D. In other embodiments, the self-balancing transport assembly 100 is configured to be controlled by a hand control 240, as that described in relation to FIG. 5. In other embodiments, the stretcher 300 is further configured with hand balancing controls 310 that communicate with shocks 320 to help balance a load in the stretcher 300.

In these embodiments, a user can easily push (even run) uphill with the stretcher 300, including over rough terrain as may be found in a rescue, because the transporter 110 is moving the load under the directional control of the user. In embodiments, the transporter 110 utilizes a braking and recharging system of a brushless electric motor to slow the stretcher 300 downhill with minimal effort of the user. In these embodiments, the transport 110 moves forward when the stretcher 300 is tilted forward because the center of gravity above an axle of the transporter 110 is shifted forward and a sensor on the transporter 110 senses the weight shift and engages the motor of the transporter to move in the direction of the weight shift to catch up so the center of gravity is once again under an axle of the wheel of the transporter 110. Moreover, with the hand control 240, a user can choose to have the transporter 110 push or pull with more force or speed depending on the user's selection. For example, a user may elect to have an additional 5, 10, 15, 20, etc. pounds of force added to the movement of the transporter 110 to get the stretcher 300 up a hill more quickly. In embodiments, the transporter 110 is a Onewheel brand electric transporter.

The shock elements 320 may include or be one or more shock-absorbing elements to absorb a sudden stop of the transporter 100, without transferring this sudden stop to the user controlling the stretcher 300 or person in the stretcher 300. Any suitable shock absorbing element may be employed, including a gas- or spring-loaded shock absorber, etc. The shock elements 320 may also be coupled to a hand control 310 that controls the shocks 320 to help balance a load in the stretcher that becomes off balance in a side-to side fashion. In these embodiments, a user can engage a left shock control 310 to engage a left shock element 320 and a user can engage a right shock control 310 to engage a left right element 320 to help correct over tilting in a left or right direction.

Further embodiments of a self-balancing transporter 10 also comprise a compartment 120 configured to hold electronics and one or more batteries for the self-balancing transporter. For example, in some embodiments depicted in FIGS. 1-6, a compartment 120 is attached to a structure of the self-balancing assembly and contains the electronics and computer system that controls the balancing mechanisms of the self-balancing transporter as well as the battery that powers the transporter. For example, a gyroscope, battery and computer control mechanisms for powering and balancing the self-balancing transporter (or gravity centering cart). In other embodiments depicted in FIGS. 1-6, the self-balancing assembly does not have a compartment 120 and instead has electronics and a battery stored at, on, or near the self-balancing transporter. For example, in embodiments utilizing a Onewheel as the self-balancing transporter, the electronics and battery are located underneath the platform of the Onewheel. In other embodiments, the electronics and computer system that controls the balancing mechanisms of the self-balancing transporter as well as the battery that powers the transporter is located within a wheel of the transporter.

In some embodiments, the self-balancing transporter 10 (also referred to as a gravity centering cart) comprise one or more wheels with a brushless electric motor that spins to propel the cart forwards or backwards, and makes thousands of micro-adjustments per second to keep the cart balanced. To direct the cart, a user pushes or pulls the cart slightly in the direction they want it to travel. In some embodiments, the cart has one or more internal accelerometers and gyroscopes that continuously measure the orientation of the cart in space. In some embodiments, the accelerometers and gyroscopes are read approximately 14,000 times per second in order to tell the motor what to do to help balance and move the cart.

In embodiments, users can utilize an application on their smartphone that communicates with the cart wirelessly (e.g., Bluetooth), with the app displaying things such as battery charge and miles traveled and provides functions to the user that regulates different modes, such as modes for light or heavy loads or for different terrain or other cart functions that permit a user to customize how the cart will operates or respond to user controls.

The subject matter disclosed herein is operable to be used with any commercially available gravity centering device. For example, with reference to FIGS. 1 and 2, stem-controlled transporter 40 may be used that relies on hand movements. In accordance with an embodiment, a self-balancing transport assembly 10 utilizes a stem-controlled type self-balancing transporter 40 such as an Airwheel brand self-balancing transporter with stem control. In these embodiments, an engagement attachment 50 is configured to engage an Airwheel transporter with stem control, wherein embodiments of a stabilizing structure 20 or load bearing structure 60 is configured to permit the user to move the Airwheel with slight movements of the stabilizing structure 20 or load bearing structure 60.

In various embodiments, the self-balancing transport assembly 10 may include, in lieu of or in addition to the wheel of the transporter 40, or more terrain-contacting elements. For example, a terrain-contacting element may be any suitable wheel including but not limited to solid wheels, pneumatic tires, and the like, skis, skids, skates, casters, glides, air (such as in hovercraft), etc. The number and dimensions of the terrain-contacting elements may be adequate to provide independent stability to the self-balancing transport assembly 10 while it is moved by a user 30 over various terrain, such as snow, mud, or rocks. In other embodiments the number and dimensions of ground-contacting elements attached to the self-balancing transport assembly 10 provide additional stability when the self-balancing transporter 10 is utilized with the stabilizing structure 20 or load bearing structure 60 by a user 30 that requires additional stability because of lack of strength or balance on uneven terrain.

Referring to FIGS. 7, 8, 9, and 10, embodiments of a gravity centering cart 10 are shown with a load carrying structure 20 and a handle 30. In embodiments, the load carrying structure 20 is any container that is appropriate to carry an intended load, for example a bucket (shown in FIG. 7) can be used to transport gardening items and a basket can be used to carry groceries or tools. In these embodiments, a user can transport items, up to a load of up to 250 pounds or more, in the load carrying structure 20 and the gravity centering cart 10 will provide a near zero or minimal resistance transport as the user pulls or pushes on the handle 30. When the gravity centering cart 10 is activated, and its self-balancing functionality engages, the user only needs to lightly push or pull the handle 30 to move the gravity centering cart 10 and the weight of the items in the load carrying structure 20 to an intended destination.

In other embodiments, the user can walk with the gravity centering cart 10 behind the user with the handle 30 connected to the user, for example, near a waistline with, for example, magnets in the handle and on a belt of the user.

In embodiments, the gravity centering cart 10 comprises a two-wheel hoverboard 15 that has two elevated engagement arms 40 permanently or removably fixed to the hoverboard that are used to connect the load carrying structure 20 to the gravity centering cart 10. In embodiments, the elevated engagement arms 40 are integral or separate structures from the hoverboard. In embodiments, the elevated engagement arms 40 each comprise an L-shaped structure with a flat bottom portion 50 and an elongated vertical portion 60 that the load carrying structure 20 is rotatably fixed between. In other embodiments, the elevated engagement arms 40 each comprise a structure that provides an articulation point in a plane above the gravity centering cart 10. In embodiments, the elevated engagement arms 40 can be a variety of lengths with the articulation point at any point along the arms 40 or a variety of shapes (does not need to be an L shaped structure) that provide for the load to articulate back and forth over the gravity centering device, which is a one or two-wheel hoverboard in some embodiments. For example, in embodiments, the elevated engagement arms 40 can be just long enough to permit the load carrying structure 20 to articulate back and forth above the gravity centering cart 10 (for example, as in FIGS. 7 and 8) or longer such that the bottom of the load carrying structure 20 is held up higher from the gravity centering cart 10 (for example, as in FIG. 9). In other embodiments, the articulation point for the load carrying structure 20 can be anywhere along the arms 40. In embodiments, the load carrying structure 20 is rotatably fixed between the arms 40 in a plane above the load carrying structure.

Figure 7:
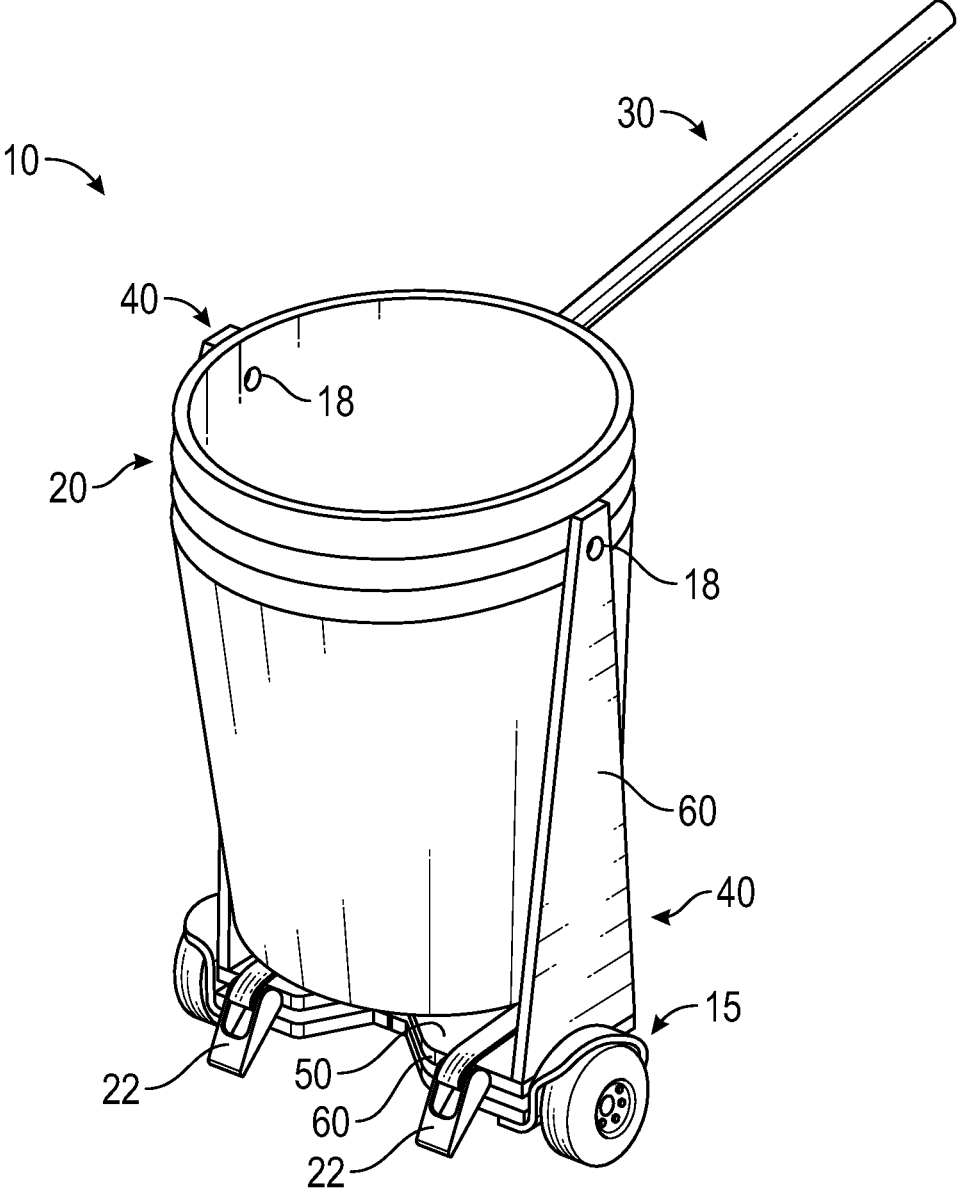
FIG. 7 is a perspective side view of a multi wheel gravity centering cart in accordance with one or more embodiments of the present invention.
Figure 8:
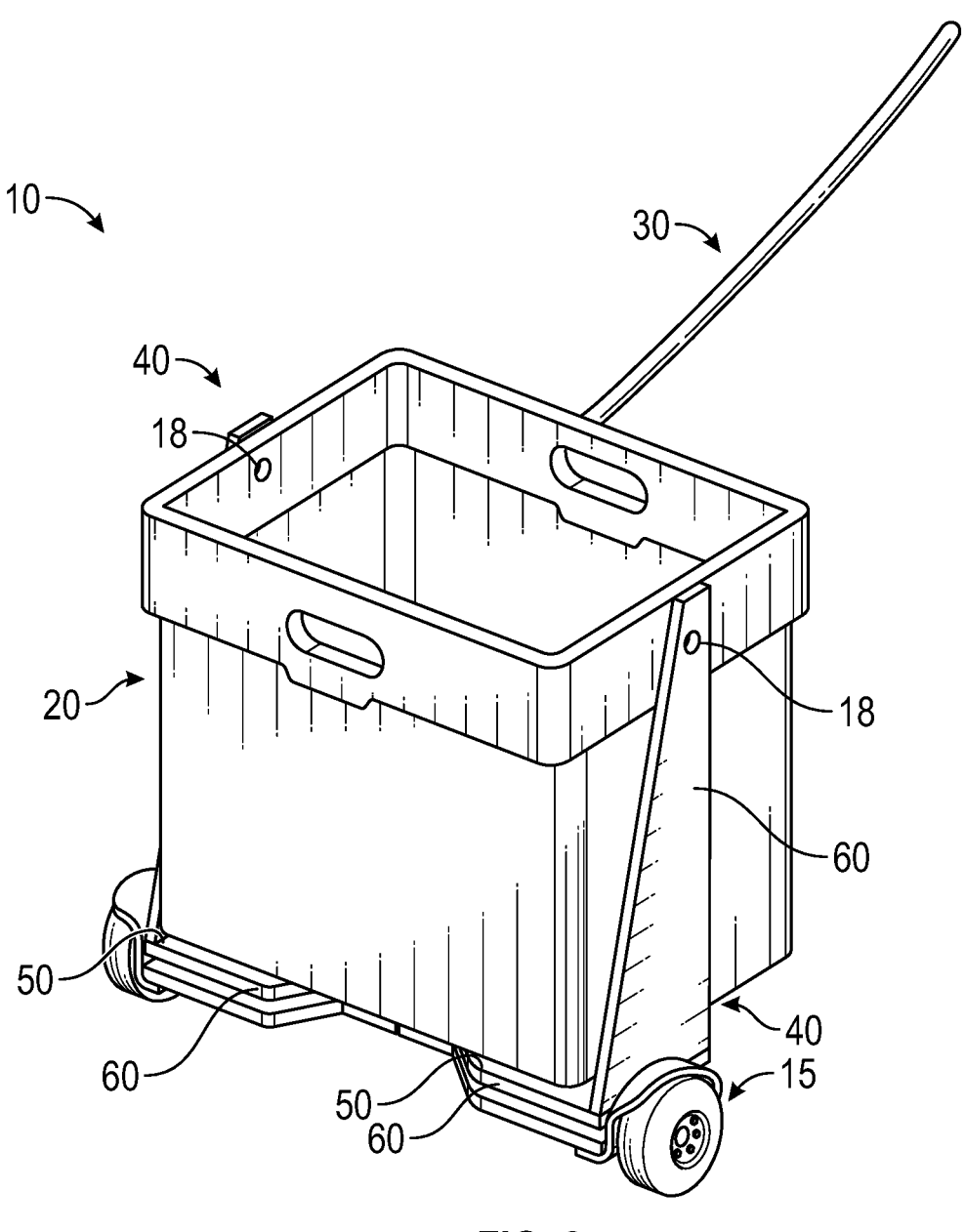
FIG. 8 is a perspective side view of a multi wheel gravity centering cart in accordance with one or more embodiments of the present invention.
Figure 10:
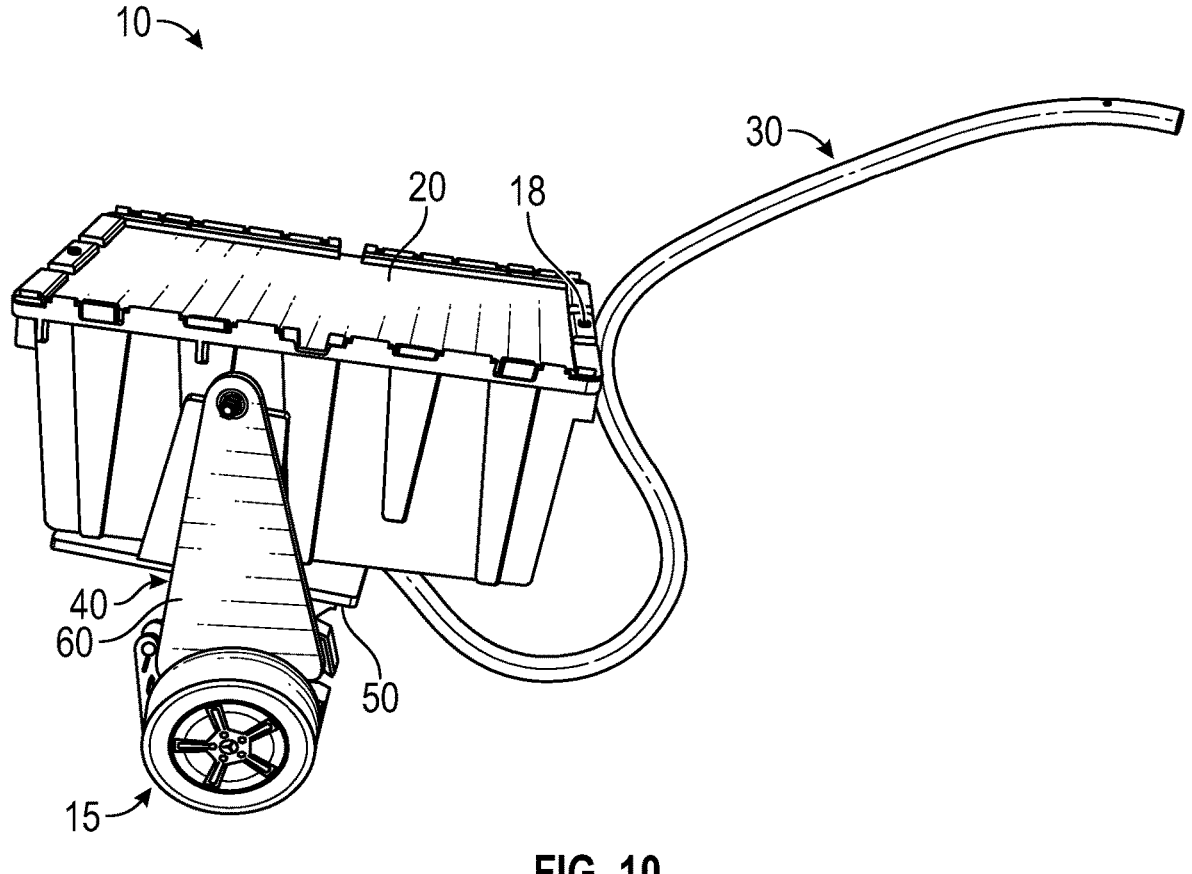
FIG. 10 is a perspective front view of a multi wheel gravity centering cart in accordance with one or more embodiments of the present invention

As shown in FIG. 7, a bucket is the load carrying structure 20 that is rotatably fixed between the elongated vertical portions 60 of the L-shaped structures, and in FIGS. 8 and 10, a basket is the load carrying structure 20 that is rotatably fixed between the elongated vertical portions 60 of the L-shaped structures. In embodiments, the load carrying structure 20 is rotatable fixed between the L-shaped structures using any fastener or coupler 18 (like a bolt or screw) that will affix either side of the structure 20 to each of the elongated vertical portions 60 above the wheels of the hoverboard 15 and in the same plane as the center of gravity of the cart 10. That way when the load carrying structure 20 is displaced, the cart 10 will automatically follow that weight displacement because of the hoverboard's gravity centering properties. In embodiments, commercially available hoverboards that can be used as part of a gravity centering cart 10 generally have the following weight limits: a 4.5" hoverboard has a 120 lbs weight limit, a 6.5" hoverboard has a 220 lbs weight limit, an 8" hoverboard has a 265 lbs weight limit, and a 10" hoverboard has a 330 lbs weight limit.

In embodiments, the load carrying structure 20 is rotatably coupled to the elevated engagement arms 40 above the center of gravity of the two-wheel hoverboard 15 such that a user can pull the cart with a near zero or minimal resistance because the cart is constantly trying to put the wheels of the cart underneath the center of gravity of the articulated weight of the load carrying structure 20 above the hoverboard 15. Thus, when a user pulls the handle 20 of the cart 10, the self-balancing functionality of the hoverboard 15 will cause the hoverboard 15 to move forward and attempt to put the hoverboard 15 underneath the moving center of gravity caused by the forward movement of the load carrying structure 20.

In embodiments, the elevated engagement arms 40 are permanently or removably fixed to each footpad 60 of the two-wheel hoverboard 15. As shown in FIGS. 7 and 10, the flat bottom portions 50 of the L-shaped structures are each removably fixed to the hoverboard 15 using adjustable straps 22 to hold the flat bottom portions 50 in place and pressing against the foot pedals of the hoverboard that engage the hoverboards self-balancing functionality. In an embodiment, the straps 22 are racketing straps that permit the flat bottom portions 50 to be affixed to the hoverboard 15 and pressed against the footpads 60 of the hoverboard where a user would normally stand on the hoverboard 15 and activate the self-balancing functionality when the hoverboard 15 is turned on. Each footpad 60 of the two-wheel hoverboard is engaged by the flat bottom portion 50 of the elevated engagement arms pressing down on the footpad 60. With each footpad 60 engaged, when the hoverboard 15 is turned on, the self-balancing functionality of the hoverboard 15 will self-balance and stand upright on its two wheels without a user holding the gravity centering cart 10 even with a load in the load carrying structure 20, as depicted in FIG. 7.

Figure 9:
FIG. 9 is a perspective front view of a multi wheel gravity centering cart in accordance with one or more embodiments of the present invention.
Figure 9:
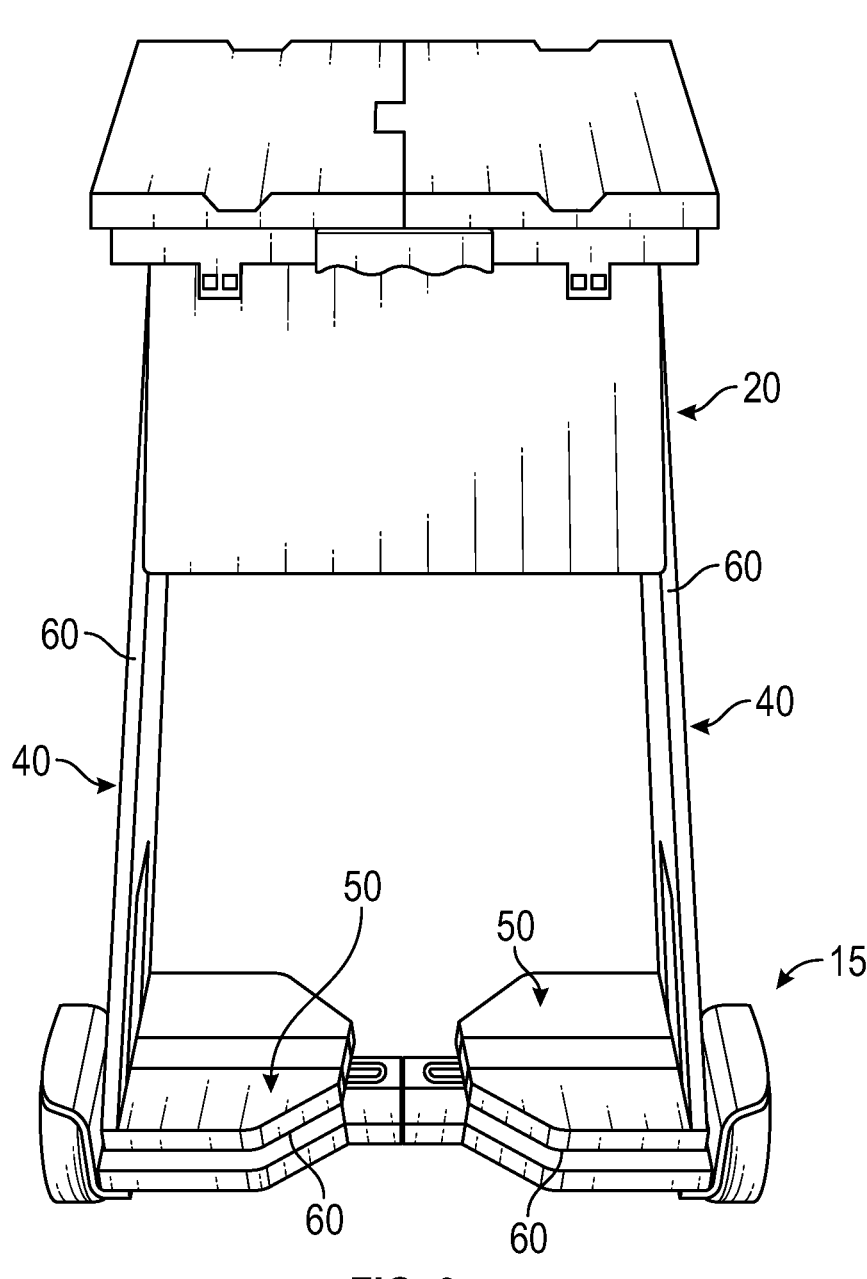

In other embodiments, the elevated engagement arms 40 are permanently fixed or integrally built into each side 60 of a two-wheel hoverboard 15. As shown in FIGS. 8 and 9, the elevated engagement arms 40 are each permanently fixed or integrally built into each side 60 of a two-wheel hoverboard 15. In these embodiments, when the hoverboard 15 is turned on, the self-balancing functionality of the hoverboard 15 will self-balance and stand upright on its two wheels without a user holding the gravity centering cart 10 even with a load in the load carrying structure 20, as depicted in FIG. 9. The gravity centering cart 10 is then moved with minimal effort by a user by pushing or pulling a handle (for example in FIG. 8) or by pushing or pulling the load carrying structure 20 or the elevated engagement arms 40.

When the gravity centering cart 10 is turned on and engaged, the cart 10 with a significant load, the total size depending on the power of the hoverboard, with minimal resistance, can be pushed or pulled by a user 30 as he walks forward, walks backward, or stops. In these embodiments, the gravity centering cart 10 follows the direction of movement of the user with minimal resistance because the gravity centering cart 10 is maximizing the functionality of the self-balancing functionality of the hoverboard to move the hoverboard under the center of gravity of the load carried in the load carrying structure 20. By slight movements forward and backward on the gravity centering cart 10, for example by pushing or pulling the handle 30, the user controls the forward and backward movement, speed, and the turning of the gravity centering cart 10.

Because the user is separated from the gravity centering cart 10, the user is no longer required to be a skilled user of a self-balancing transporter like a hoverboard to utilize the improved functionality of the gravity centering cart 10. Instead, a user can simply walk in any desired direction with the handle 30 and the gravity centering cart 10 will follow with a near zero or minimal resistance to the user despite a load in the load carrying structure 20. This separation causes a substantial increase in safety over the use of the hoverboard by itself. In embodiments, because the gravity centering cart 10 is not integral with the user, since the user can let go or detach themselves from the gravity centering cart 10, should the cart 10 strike an obstruction, such as a rock, curb, bump, or the like, the effect of the obstruction is not transferred to the user. This arrangement, combined with other safety features, such as a magnetically detachable coupling between a magnet on a user and the handle 30, the safety features of the gravity centering cart 10 protects the user from a fall or resultant injury.

In embodiments that require a user to walk to give a small push or pull force on the gravity centering cart 10, the user is benefitting from walking and exercising. Users that normally would be unstable or unsure walking with a load, such as groceries or other shopping items, will greatly benefit from using the gravity centering cart 10 because the cart 10 is carrying the load for the user and all the user needs to do is guide the cart 10 and give it a slight pull or push to have it move along. In these embodiments, in addition to exercise and health benefits, a user's efforts are multiplied with the gravity centering cart 10 and the load bearing structure 20 carrying an additional load for the user.

In embodiments, the self-balancing transporter is a two-wheel hoverboard, such as an HX Phantom hoverboard, HX Hoverboard (hoxerx.com). Any commercially available hoverboard may be used in embodiments, such as hoverboards made by Halo Rover, Gotrax, Segway, Razor, and Gyroor. These hoverboards are desirable because they incorporate self-balancing technology and UL2272 safety compliant.

In embodiments, a user can turn the gravity centering cart 10 using the handle connected to the load carrying structure 20. For example, moving the handle 30 left will cause the gravity centering cart 10 to lean, and thus turn, left. The same is true for turning right, with movement right by the user holding the handle will cause the transporter to turn right. Example embodiments of gravity centering cart 10 made in accordance with FIGS. 7 through 10 may utilize a HX Phantom hoverboard with a load bearing structure 20.

In embodiments, the hoverboard 15 comprises a board, a wheel assembly, a motor assembly, at least one sensor, and a motor controller. The hoverboard 15 may include first and second deck portions each configured to receive a load. The wheel assemblies may be disposed outside each of the first and second deck portions and each include a ground-contacting element, such as a wheel. The motor assembly may be mounted to the hoverboard 15 and configured to rotate the ground-contacting elements around an axle to propel the hoverboard 15. A sensor of the hoverboard 15 may be configured to measure orientation information of the hoverboard 15. The motor controller may be configured to receive orientation information measured by the sensor and to cause the motor assembly to propel the hoverboard 15 based on the orientation information. For example, the hoverboard 15 may be propelled by the motor based on the orientation of the board, with the hoverboard 15 moving forward when the board is tilted forward or backward when the board is tilted backward. In another example, the sensor is configured to cause the hoverboard 15 to move in a direction of the center of gravity that is coupled to the gravity centering cart 10, so as the center of gravity is tiled forward (for example by a user pulling the handle 30 on the load carrying structure 20 or pushing or pulling one or more of the elevated engagement arms 40), the gravity centering cart 10 will move forward, and likewise will move backward with the center of gravity is tiled backward.

In embodiments, the self-balancing transporter is a two-wheel hoverboard, such as an HX Phantom hoverboard, HX Hoverboard (hoverx.com). Any commercially available hoverboard may be used in embodiments, such as hoverboards made by Halo Rover, Gotrax, Segway, Razor, and Gyroor. These hoverboards are desirable because they incorporate self-balancing technology and UL2272 safety compliant.

In embodiments, a user can turn the gravity centering cart 10 using the handle connected to the load carrying structure 20. For example, moving the handle 30 left will cause the gravity centering cart 10 to lean, and thus turn, left. The same is true for turning right, with movement right by the user holding the handle will cause the transporter to turn right. Example embodiments of gravity centering cart 10 made in accordance with FIGS. 7 through 10 may utilize a HX Phantom hoverboard with a load bearing structure 20.

Figure 11:
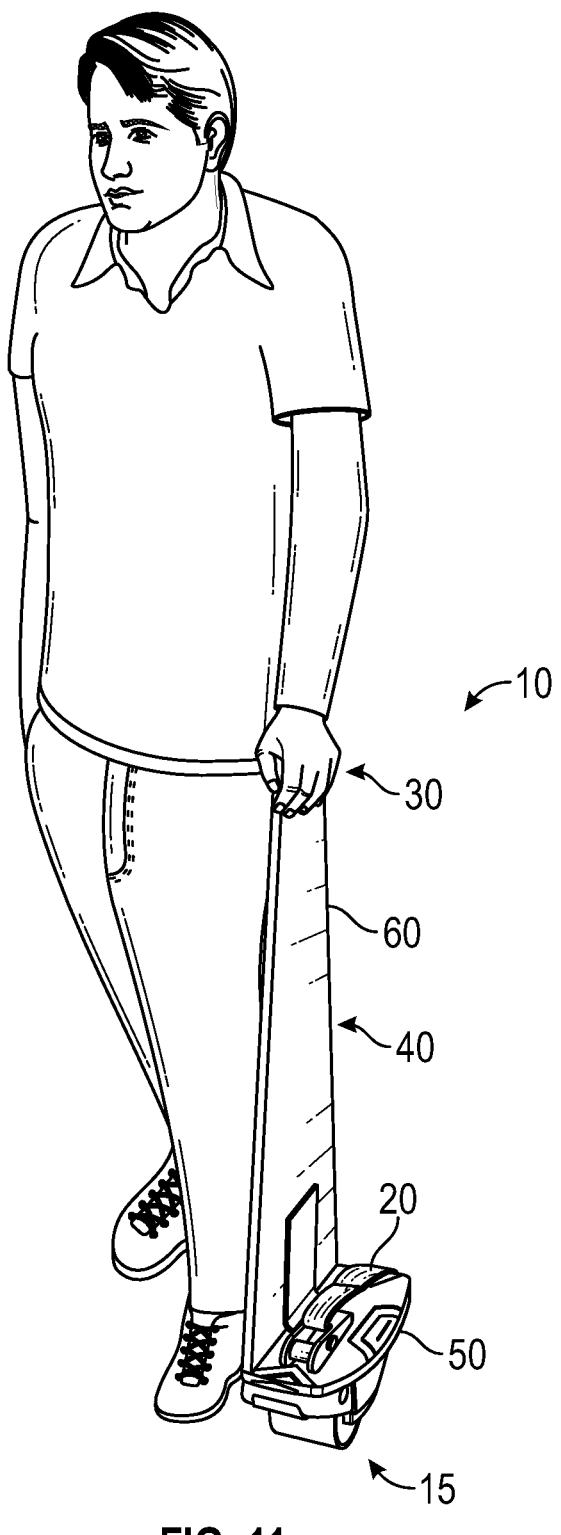
FIG. 11 is a perspective front view of a single wheel gravity centering cart in accordance with one or more embodiments of the present invention.
Figure 12:
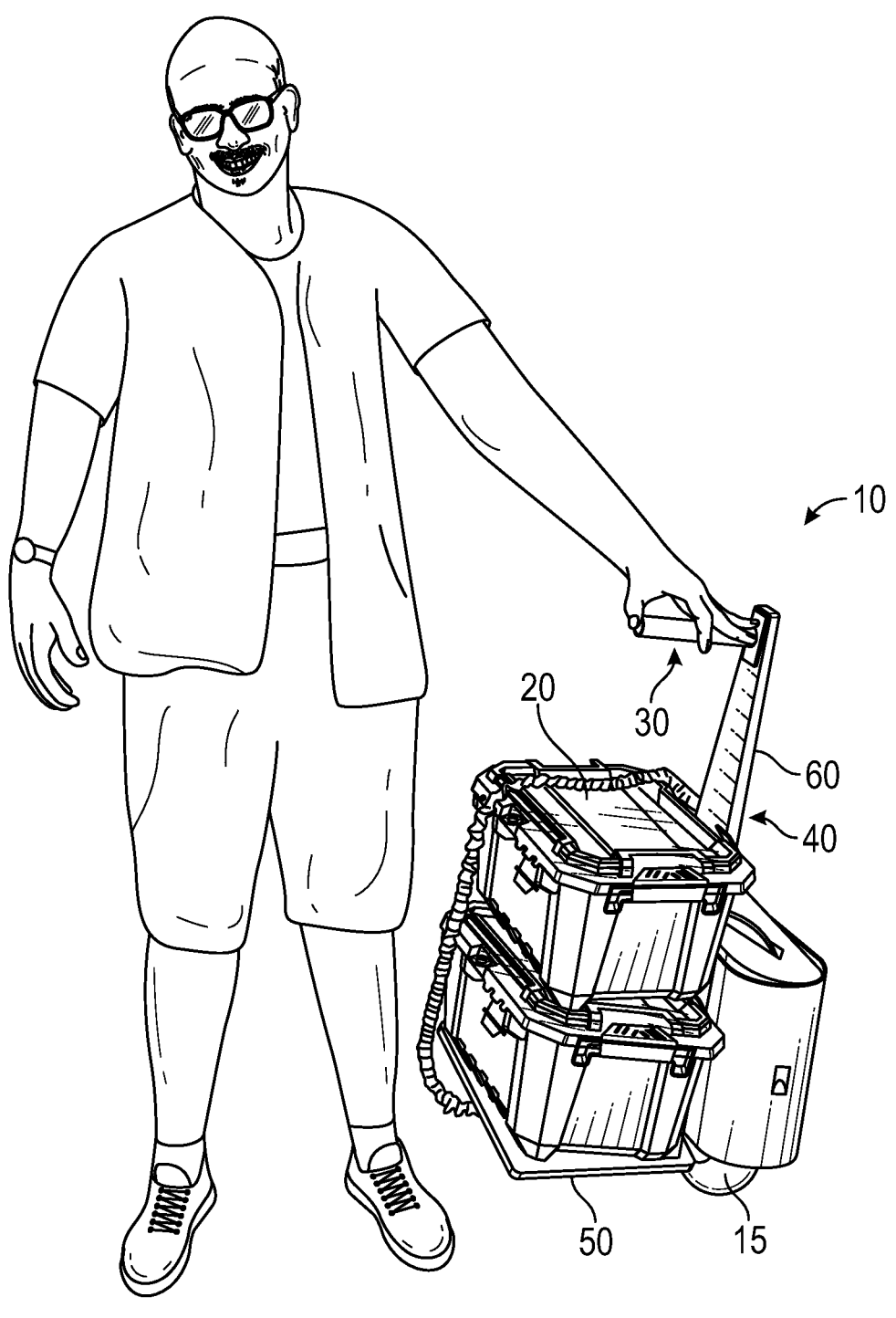
FIG. 12 is a perspective front view of a single wheel gravity centering cart in accordance with one or more embodiments of the present invention.

In other embodiments, a single wheel gravity centering cart 10 can be used from everything to a support for a user when walking (for example FIG. 11) to a hand truck that can carry heavier loads (for example FIG. 12). In such embodiments, the single wheel gravity centering cart 10 comprises a load carrying structure 20 that is fixed or integrally built into a single wheel hoverboard 15. For example, as shown in FIG. 12, a load carrying structure 20 is carried on a platform 50 on a side of the hoverboard wheel on the gravity centering cart 10. In these embodiments, when the hoverboard 15 is turned on, the self-balancing functionality of the hoverboard 15 will self-balance the load above the wheel on load carrying structure 20 such that the wheel will move to the center of gravity of the load until it is above the wheel of the hoverboard 15. The gravity centering cart 10 is then moved with minimal effort by a user walking beside the cart 10 by pushing or pulling a handle 30 (for example in FIG. 12) or an elevated engagement arm 40 attached to the load carrying structure 20. In embodiments, the hoverboard 15 comprises a board, a wheel assembly, a motor assembly, at least one sensor, and a motor controller. The hoverboard 15 includes at least a first deck portion 50 configured to receive a load held on the load carrying structure 20. The wheel assembly may be disposed under the deck portion, and each include a ground-contacting element, such as a wheel. The motor assembly may be mounted to the hoverboard 15 and configured to rotate the ground-contacting element around an axle to propel the hoverboard 15. A sensor of the hoverboard 15 may be configured to measure orientation information of the hoverboard 15. The motor controller may be configured to receive orientation information measured by the sensor and to cause the motor assembly to propel the hoverboard 15 based on the orientation information. For example, the hoverboard 15 may be propelled by the motor based on the orientation of the board, with the hoverboard 15 moving forward when the board is tilted forward or backward when the board is tilted backward. In another example, the sensor is configured to cause the hoverboard 15 to move in a direction of the center of gravity that is coupled to the gravity centering cart 10, so as the center of gravity is tiled forward (for example by a user pulling the handle 30 or pushing or pulling an elevated engagement arm 40), the gravity centering cart 10 will move forward, and likewise will move backward with the center of gravity is tiled backward by pushing or pulling the handle 30 or the elevated engagement arm 40.

In other embodiments, the gravity centering cart is configured to automatically adjust to erratic environments like rough terrain or improper handling by the user. The electronic configuration in this embodiment would calibrate itself on a regular basis to account for changes in include or bumpy terrain. For example, if the cart hits a rock and becomes off-balance because it cannot self-balance due to the impediment, the gyroscope will sense an imbalance and the motor sensor will sense a higher-than-normal resistance. Without a speed-limiter as part of this configuration, the wheels would speed and send the cart out of control. However, with this configuration, the cart would gently rest until the imbalance is fixed. This configuration is critical to preventing equipment or user injury. Similar to this configuration for erratic terrain or usage, the cart often needs user intervention. If the user lets go of the handle, the cart could swerve downhill in certain situations. Thus, this embodiment includes a user sensor, such that if the user lets go of the handle, the cart will gently slow down and stop, rather than accelerating downhill and causing equipment damage or user injury. In alternate embodiments, the user-sensor may be replaced by a button, switch, lever or other mechanism to verify that the user is touching the cart. In this embodiment, the cart has weight sensors to automatically adjust the cart balancing system if the load is too heavy or imbalanced. Without such features, the cart may become heavier on one side than another. If this occurs without such a configuration, an imbalanced cart can "run away" from the user, accelerating in a direction without the user intending for that to happen. This can cause equipment or user injury. Hance, it is important to have a sensor that can detect imbalance and automatically generate a counteracting force to correct the imbalance.

In another embodiment, the gravity centering cart has a battery charging apparatus that allows the user to easily set the cart for charging, without having to plug in the device manually. This fosters a better and safer product because the cart will be charged more easily. This mitigates having to depend on the user to remember to charge the cart. In this embodiment, the cart may be set upon a charging pad, which can wirelessly charge the cart. In other embodiments, the cart is rested on a cradle, where the charging can occur by spring-loaded charging pads which touch the electrical interface on the cart Other embodiments are considered part of this invention would include strollers, wagons, shopping carts, luggage carts, gold caddy carts and other similar cart embodiments, and these are the same invention because they depend on the same technology, behave in the same way, solve the same problems and are no markedly different than this disclosed underlying innovation.

The subject matter disclosed herein is operable to be used with any commercially available self-balancing transporter, such as a one or two-wheel hoverboard. These commercially available hoverboards contain the electronics and programs necessary for propulsion and self-balancing of the unit.

Other embodiments may include combinations and sub-combinations of features described or shown in the several figures, including for example, embodiments that are equivalent to providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph. "feature" or "features" can refer to structures and/or functions of an apparatus, article of manufacture or system, and/or the steps, acts, or modalities of a method.

References throughout this specification to "one embodiment," "an embodiment," "an example embodiment." etc., indicate that the embodiment described may include a particular feature, structure, or characteristic, but every embodiment may not necessarily include that particular feature, structure, or characteristic. Moreover, such phrases are not necessarily referring to the same embodiment. Further, when a particular feature, structure, or characteristic is described in connection with one embodiment, it will be within the knowledge of one skilled in the art to affect such feature, structure, or characteristic in connection with other embodiments whether or not explicitly described.

Unless the context clearly indicates otherwise (1) the word "and" indicates the conjunctive; (2) the word "or" indicates the disjunctive; (3) when the article is phrased in the disjunctive, followed by the words "or both," both the conjunctive and disjunctive are intended; and (4) the word "and" or "or" between the last two items in a series applies to the entire series.

Where a group is expressed using the term "one or more" followed by a plural noun, any further use of that noun to refer to one or more members of the group shall indicate both the singular and the plural form of the noun. For example, a group expressed as having "one or more members" followed by a reference to "the members" of the group shall mean "the member" if there is only one member of the group.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

What is claimed:

1. A gravity centering cart comprising at least one electrically driven wheel with a housing structure, at least one engagement arm secured to the wheel's housing structure, the engagement arm comprising a first portion connected to the wheel's housing structure and a second portion rotatably secured to a load carrying structure, wherein the load carrying structure is rotatably coupled in a plane above a center of gravity of the wheel such that when the center of gravity of the cart is shifted by rotation movement of the load carrying structure, the cart will move in the direction of the shift with minimal resistance.

2. The gravity centering cart of claim 1, further comprising a handle configured to move the gravity centering cart when a user pulls or pushes the handle.

3. The gravity centering cart of claim 1, wherein the wheel's housing structure contains electronics for the gravity centering cart.

4. The gravity centering cart of claim 1, wherein the load carrying structure comprises a wheelbarrow.

5. The gravity centering cart of claim 1, wherein the load carrying structure comprises a stroller.

6. The gravity centering cart of claim 1, wherein the load carrying structure comprises a walker.

7. The gravity centering cart of claim 1, wherein the load carrying structure comprises a hand truck.

8. The gravity centering cart of claim 1, wherein the at least one electrically driven wheel is a multi-wheel hoverboard.

9. The gravity centering cart of claim 1, wherein the at least one electrically driven wheel is a one wheel device.

10. The gravity centering cart of claim 1, wherein the load carrying structure comprises a stretcher.

11. The gravity centering cart of claim 1, wherein the load carrying structure is configured to carry a load over the wheel.

12. The gravity centering cart of claim 1, wherein the load carrying structure is attached at an articulation point above the wheel such that the load carrying structure is rotatable above the wheel.

13. The gravity centering cart of claim 1, further comprising an elongated structure configured to attach to a user and provide stability.

14. The gravity centering cart of claim 1, further comprising a hand control configured to control a speed or force of the wheel.

15. The gravity centering cart of claim 1, further comprising shock elements configured to balance a load along an axis perpendicular to an axle of the wheel.

16. The gravity centering cart of claim 1, further comprising a smartphone application that communicates with the cart wirelessly.

17. The gravity centering cart of claim 1, wherein the cart is configured to not be ridden by the user.

18. The gravity centering cart of claim 1, further configured to automatically adjust its speed or power in response to erratic terrain or movements.

19. The gravity centering cart of claim 1, wherein the load carrying structure comprises a load bearing cart.

20. The gravity centering cart of claim 1, wherein the load carrying structure comprises a grocery cart.

* * * * *